Sept. 20, 1955  B. H. SCHAUB  2,718,157
POWER TRANSMISSION SYSTEM
Filed April 2, 1948  5 Sheets-Sheet 1
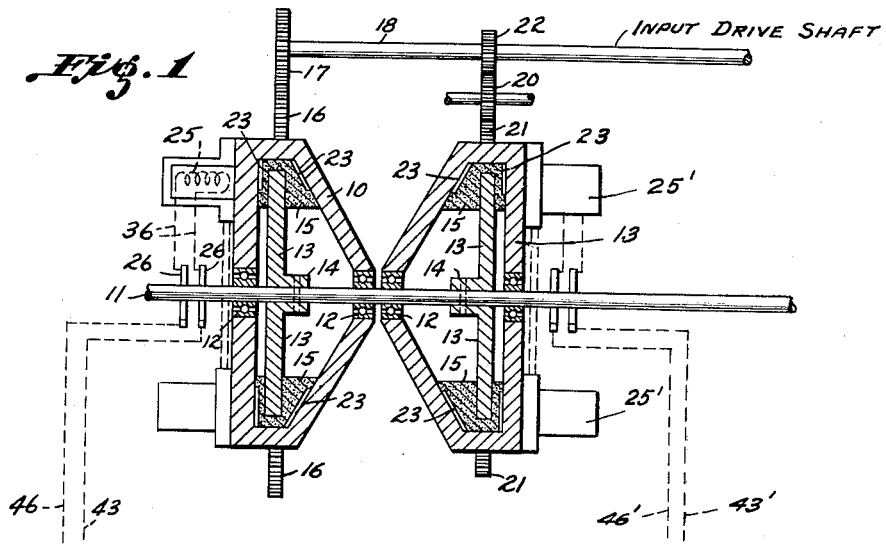
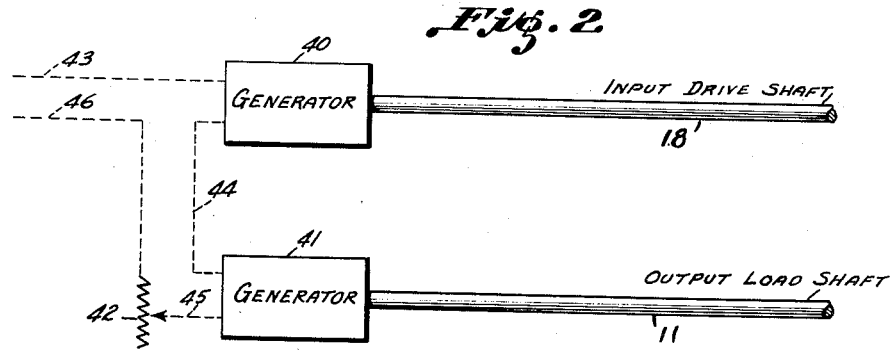
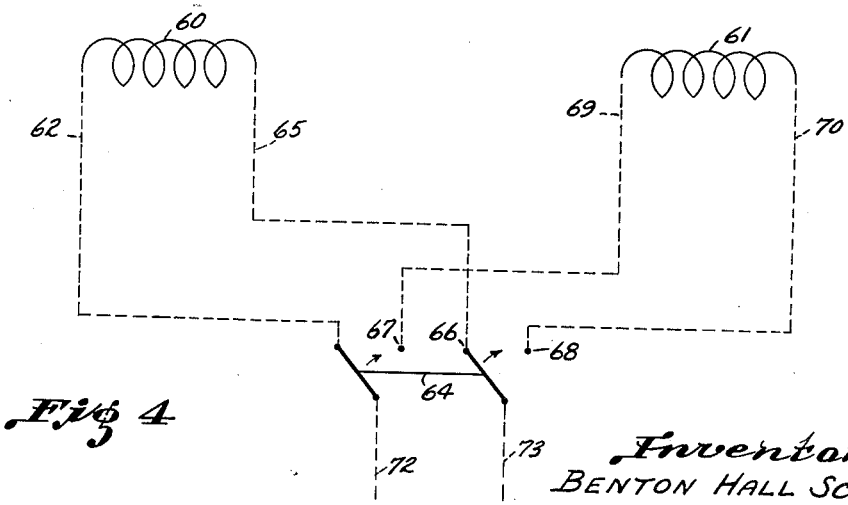
Inventor:
BENTON HALL SCHAUB
By Moore & Hall,
Attorney:

Sept. 20, 1955  B. H. SCHAUB  2,718,157
POWER TRANSMISSION SYSTEM
Filed April 2, 1948  5 Sheets-Sheet 2
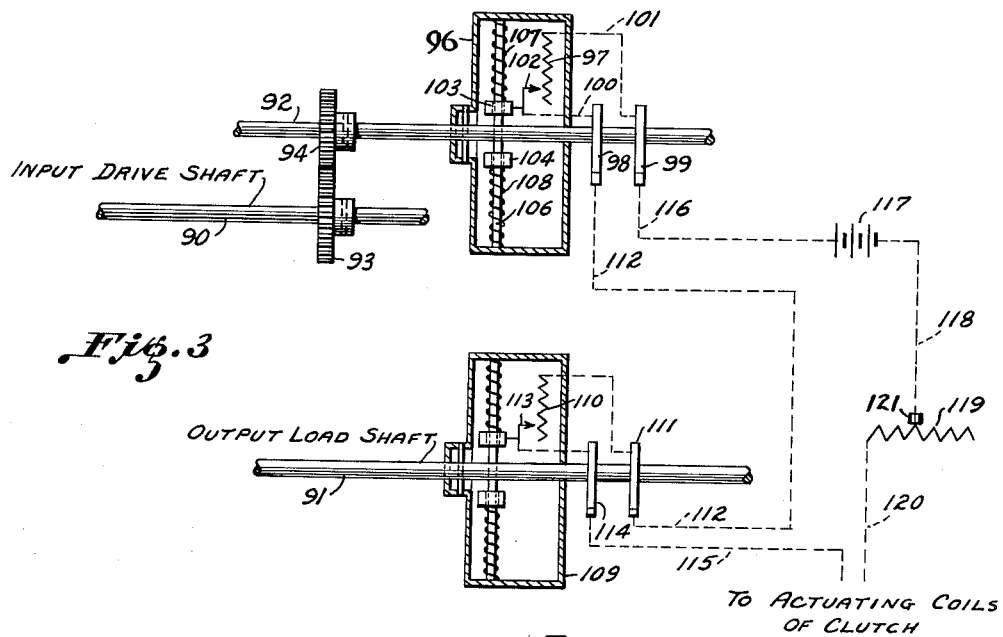
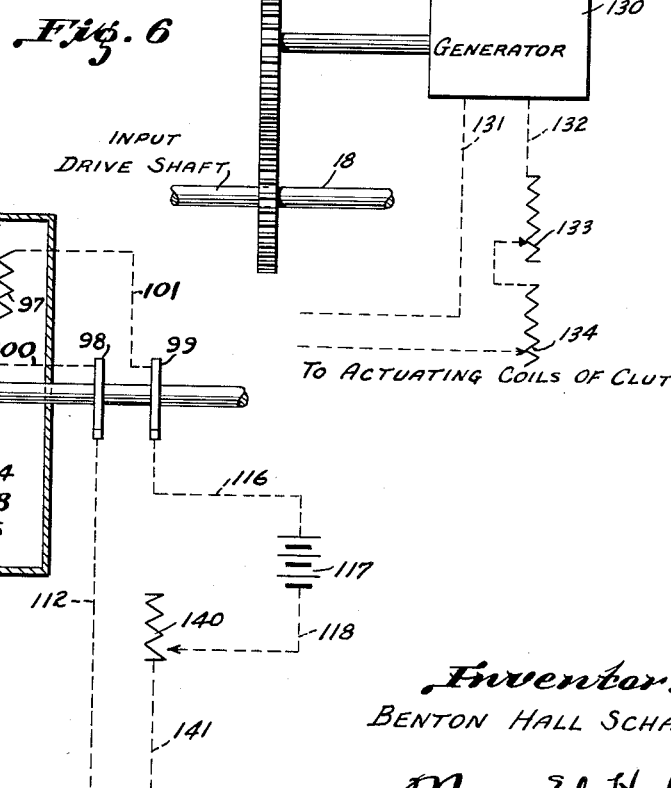
Inventor:
BENTON HALL SCHAUB
By Moore & Hall
Attorney:

Sept. 20, 1955    B. H. SCHAUB    2,718,157
POWER TRANSMISSION SYSTEM
Filed April 2, 1948    5 Sheets-Sheet 4

Inventor:
BENTON HALL SCHAUB
By Moore y Hall
Attys.

Sept. 20, 1955 B. H. SCHAUB 2,718,157
POWER TRANSMISSION SYSTEM
Filed April 2, 1948 5 Sheets-Sheet 5

INVENTOR
BENTON HALL SCHAUB.
BY Moore & Hall
ATTORNEYS

United States Patent Office 2,718,157
Patented Sept. 20, 1955

2,718,157

POWER TRANSMISSION SYSTEM

Benton Hall Schaub, Gambrills, Md.

Application April 2, 1948, Serial No. 18,842

98 Claims. (Cl. 74—472)

This invention concerns improvements in power drive, torque clutches, speed reduction and the like both for light and very heavy applications.

It is the object of the invention to provide a smooth control for the application of heavy loads.

It is an object of the invention to provide means for high efficiency gear-less speed reduction or speed change without axial shift of gears.

It is an object of the invention to provide means for the automatic control of speed ratios to meet changing load and operating conditions in vehicular transmissions.

It is an object of the invention to provide means for the automatic control of speed under varying load conditions.

It is an object of the invention to provide means for the automatic control of torque under varying speed conditions.

It is an object of the invention to eliminate motor-generator units from the drive of diesel and turbine prime movers.

It is an object of the invention to provide a power drive or transmission having a drive shaft, a driven shaft, means connecting said shafts in a power transmitting relation comprising a housing having finely divided magnetic material therein, a disc or the like of metal embedded in said material and a magnetic flux producing winding mounted either on or adjacent said housing and arranged to cause magnetic flux to affect said magnetic material, an electrical circuit comprising a first source of electrical potential having an effective value which is a function of the angular velocity of said drive shaft, a second source of electrical potential having an effective value which is a function of the angular velocity of said driven shaft and conductors including a variable impedance connecting said source of potential to said winding.

The invention lends itself to application in the automotive field, diesel and steam locomotives, heavy duty cranes, elevators, airplane engines, propeller and supercharger drives and controls, speed governors, lost motion devices for limiting the application of torque or other load, as well as in the lighter fields of control and indication.

In the drawings like numerals refer to like parts throughout.

Fig. 1 is a schematic sectional showing of one form of power transmitting means.

Fig. 2 is a schematic showing of a control diagram according to the invention.

Fig. 3 is a schematic showing of another control means.

Fig. 4 is a schematic diagram of a reversing circuit.

Fig. 6 is a schematic diagram of another control means.

Fig. 7 is a schematic diagram of another control means.

Figure 5:
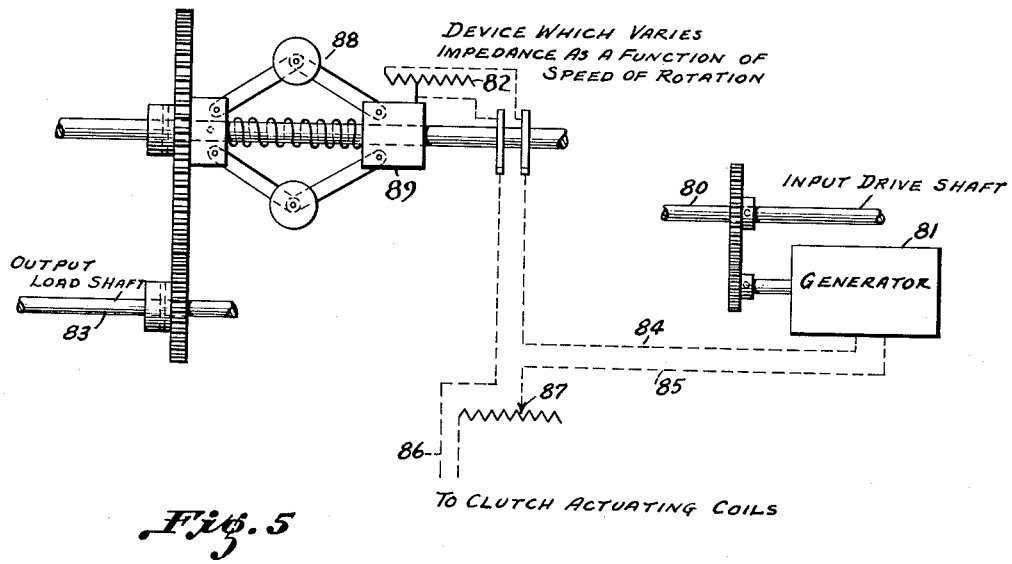
Fig. 5 is a schematic diagram of another control means having a variable impedance controled by normal acceleration.

A housing 10 is mounted on output shaft 11 by journal sealing bearings 12. A disc 13 is mounted on shaft 11 within housing 10. Disc 13 rotates with shaft 11, being keyed, pinned as at 14 or otherwise fastened thereto. Within housing 10 is magnetic material 15 which may be of colloidal character, a powder, filings or the like. The medium carrying the magnetic material may be any medium which forms a suitable vehicle for the finely divided magnetic material. Housing 10 is surrounded by a ring gear 16 which meshes with pinion 17 on power input shaft 18.

Housing 19 is a counterpart of housing 10 in all respects save that it rotates in the opposite direction by idler gear 20 which mates with ring gear 21 and pinion 22 mounted on input shaft 18.

As housings 10 and 19 are rotated, fins 23 may be used to assure that material 15 is accelerated and quickly forms an annular ring around the periphery of disc 13. A relatively weak magnetic field will cause a relatively large cohesive effect among the various magnetic particles of material 15 which are thereby caused to grip the embedded portion of disc 13. Over a quite large range the gripping effect of material 15 on disc 13 is such that the relation between the field applied and the gripping action varies as a function of the flux density. This relation may be substantially linear through a given range.

It will be seen that fins 23 now have an additional function. As the magnetic mass 15 coheres and compacts itself it may tend to reduce the reaction of the walls of housings 10 and 19 upon certain portions of it which in turn may reduce the frictional effect. This is particularly true where the viscosity of the material 15 plus its vehicle approaches that of a pasty mass or a dry mixture forming a powder. When the magnetic mass 15 plus its vehicle is a pasty mass or approaches a powder it is readily retained by journal or bearing seals 12, the bearings themselves being subject to wear and greatly shortened life if the vehicle is so fluid that it carries the very fine particles into the bearing and between the sliding or rolling surfaces thereof. Fins 23 then have a positive action upon the material 15. If desired fins 23 may be replaced by radial channels on the inner walls of housings 10 and 19. However sufficient vehicle may be added to keep the magnetic mass sufficiently "fluid" that normal acceleration will help to press it tightly against housing 10, which may be the normal case in any event where the magnetic material alone or with its vehicle approaches the powder form.

The field acting on material 15 may be created by stationary coils 24 which may be positioned around the periphery of housings 10 and 19 or may be distributed winding. Where the flux loss must be reduced moving coils 25 may be substituted for stationary coils 24. Coils 25 perform the same function as coils 24, but are mounted on the housings 10 and 19 and rotate with them. Moving coils 25 are supplied with power through slip rings 26. Where this form is used a second pair of slip rings would be mounted adjacent housing 19.

Figure 10:
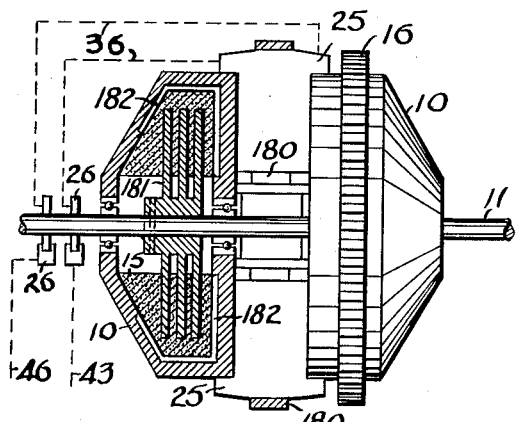
Fig. 10 is a plan view partly in section of a modified form of the invention.

The cohering field may also be produced in other ways, for example by magnets 27. Permanent magnets 27 may be positioned adjacent housings 10 and 19 on a pivot mechanism 28 controlled by collars 29 slidably mounted on shaft 11. Magnets 27 move outwardly and inwardly under the action of springs 30, weights 31 and 35 which are rotated by shaft 11. Weights 31 and 35 are pivoted by links 32 to longitudinally fixed members 33 and 34 respectively. It will be noted that the positions of weights 31 and 35 are determined by the speed of rotation of housing 19 and shaft 11 respectively.

Where the load is such that it is desirable, two housings 10 may be combined with their flat sides together and the groups of windings 24 or 25 or the groups of magnets 27 positioned therebetween. In this way the magnetic fields can effect a pair of housings 10 or a pair of housings 19 together. A plurality of housings 10 may be grouped together. Where the discs 13 are made of magnetic material, a plurality of discs 13 may be mounted on shaft 11 within a single housing 10 as shown in Fig. 10. Discs 13 may be made of non-magnetic material where the cohering action of the magnetic material is sufficient.

It is one object of the invention to control the field of coils 24 or 25 by connecting in series therewith a generator 40 driven by input shaft 18, generator 41 driven by output shaft 11 and variable impedance 42. One such electric circuit would be a group of movable coils 25, lead wires 36, slip rings 26 with their contacts, wire 43, generator 40, wire 44, generator 41, wire 45, variable impedance 42 and wire 46 back to slip rings 26.

Generators 40 and 41 may be quite small with a rated capacity of from 5 to 50 watts and may in general be either A. C. or D. C. On the other hand where the load is large as in automobiles, railway locomotives, cranes and the like the size of the generators 40 and 41 as well as housings 10, 19 may be relatively large. They are connected in series with their voltages cumulative. As the gripping action of material 15 is very large for a small field current generators 40 and 41 probably need not exceed a half horse power for any save the very heaviest applications.

Figure 12:
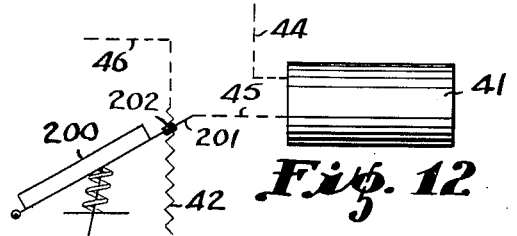
Fig. 12 is a schematic diagram showing one form of throttle control.
Figure 13:
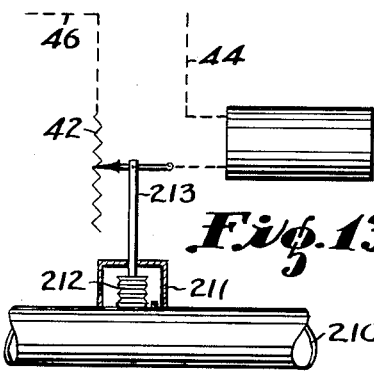
Fig. 13 is a schematic diagram showing manifold pressure control.

Impedance 42 may comprise one or a plurality of impedances individually or collectively controlled by outside conditions. Where the application of the invention is to an internal combustion engine including diesel in an automobile, truck, train or other vehicle, these variables may be the manifold pressure as indicated in Fig. 13, acceleration position as shown in Fig. 12, a manual control lever such as indicated at contact slide 121, the junction between wire 118 and impedance 119 in Fig. 3 which would be the counterpart of the present day gear lever or the like.

In Fig. 3 the circuit impedance is varied as a function of the speed of rotation and/or load on input shaft 90 and also as a function of the speed of rotation and/or load on output shaft 91. Shaft 90 is geared to stub shaft 92 by pinion 94 and gear 95 which carries a housing 96 therewith. Impedance 97 is mounted within housing 96 and connected to slip rings 98 and 99 by wires 100 and 101. Wire 100 is connected to impedance 97 by movable contact 102 mounted on weight 103. Weight 103 and its counterbalance 104 slide on rods 105 and 106 against the action of springs 107 and 108 respectively as shaft 92 rotates. A similar housing 109 and variable impedance 110 are mounted on output shaft 91 and connected in series with impedance 97 through slip ring 111 by wire 112. Movable contact 113 connects impedance 110 to slip ring 114 and wire 115. Slip ring 99 is connected by wire 116 to a battery 117 or the like, representing an independent source of D. C. or A. C. power, and through wire 18 to one or more associated impedances 119 which are in turn connected by wire 120 to actuating coils such as 24 or 25. The other side of coils 24 or 25 is connected to wire 115. The contact position of wire 18 on impedance 119 may be set by manual control by adjusting contact slide 121. Slide 121 may also be adjusted automatically as taught in Figs. 12 and 13.

Fig. 4 shows a reverse switch arrangement which may be used on automobiles, cranes as well as more delicate mechanical and electrical devices. Coil 60 corresponds to one of a group of coils 24 or 25 mounted on or adjacent forward drive housing 10. Coil 61 corresponds to one of a group of coils 24 or 25 mounted on or adjacent reverse drive housing 19. Wire 62 connects one side of coil 60 to terminal 63 of switch 64. Wire 65 connects the other side of coil 60 to terminal 66. Coil 61 is connected to terminals 67 and 68 of switch 64 by wires 69 and 70 respectively. Wires 72 and 73 lead to the input from an electrical circuit such as leads 43, 46. When switch 64 is in the position shown coil 60 is energized and the device moves forward. When switch 64 is shifted laterally to terminals 66 and 68, coil 61 is energized and the device is reversed.

In Fig. 5 an input shaft 80 drives generator 81 which is connected in series with variable impedance 82 mounted on output shaft 83. Impedance 82 rotates with output shaft 83 and its value is a function of the angular velocity of shaft 83. This may be accomplished by a moving slide black 89 controlled by centrifugal means 88 which removes or introduces impedance from or into the circuit of generator 81. Wire 84 connects generator 81 to impedance 82. Wire 85 leads from the other side of generator 81 and wire 86 from impedance 82 to clutch actuating coils 24 or 25. Other controls may be introduced into the circuit at 87 as in the case of impedance 42 in Fig. 2 and as shown in Figs. 12 and 13. A plurality of output shafts may be provided as shown in at 83A each of which may have a set of housings 10 and 19.

Fig. 6 is representative of the many types of control possible and coresponds to number five of the control arrangement table. Main drive shaft 18 drives generator 130 which supplies current to wires 131 and 132 containing impedances 133 and 134 and connected to distributed windings or coils 24 or 25. Impedance 133 may be controlled by engine throttle in the manner shown in Figure 12 or manifold pressure as shown in Fig. 13 while impedance 134 is manually controlled as discussed above in connection with Fig. 3.

Fig. 7 corresponds to number fifteen of the control table. The structure resembles the correspondingly numbered portion of Fig. 3. Wires 112 and 141 lead to windings or coils 24 or 25. Impedance 140 may be variously controlled and may be single or represent a group of separate impedances as described above.

Figure 8:
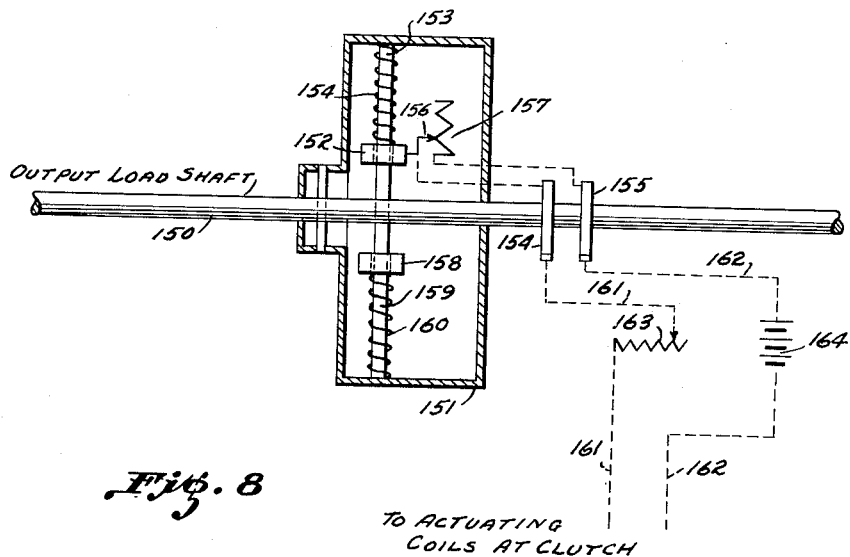
Fig. 8 is a diagram of one application of the invention to a railroad locomotive or similar vehicle.

Fig. 8 shows an angular velocity load control arrangement. Output or load shaft 150 is provided with a housing 151 which rotates therewith and accelerates weight 152 which slides outwardly on rod 153 against the action of compression spring 154. Slip rings 154 and 155 rotate with shaft 150 and are connected to movable contact 156 and resistance 157 respectively. Contact 156 is connected to and moves with weight 152. A counterbalance 158 is movably mounted on rod 159 and biased by spring 160. Slip rings 154 and 155 are connected to windings or coils 24 or 25 by wires 161 and 162, having variable impedance 163 and an external source of potential such as battery 164 in the circuit. Impedance 163 is manually controlled, but may of course include automatically controlled portions elsewhere discussed where the power source and general application make them desirable.

Figure 9:
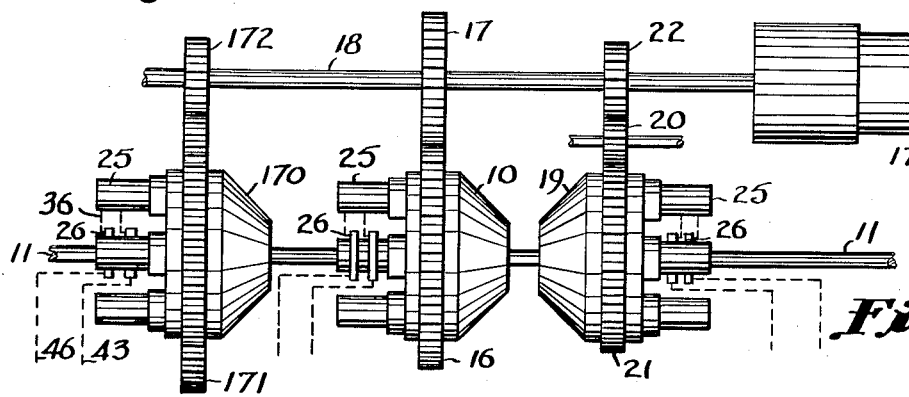
Fig. 9 is a plan view of one arrangement of the invention.

Fig. 9 shows one way in which a plurality of housings 10 and 19 may be applied to a drive and driven shaft. Housing 170 is driven by diesel or turbine 173 through shaft 18, pinion 172 and ring gear 171. The ratio of gear 171 to pinion 172 differs from that of gear 16 to pinion 17. While speed ratios of any value can be obtained by causing discs 13 to slip in magnetic material 15 where substantial loads are involved this slipping action is preferably used for smooth load application or clutching action. The limiting factors are allowable energy loss and rate of heat dissipation. In Fig. 9 coils 25 and 24 may be regarded as interchangeable. Also a plurality of output shafts 11 may of course be provided.

Figure 10 shows two housings 10 side by side with coils 25 mounted radially therebetween and may be held in place by strap 180. Coils 25 are preferably bolted to both housings 10 which turn as a unit, requiring only one ring gear 11 for the two. As this construction is used for heavy loads, multiple discs 181 may be employed. Channels 182 are the counterparts of fins 23 and are intended to serve a similar function.

Figure 11:
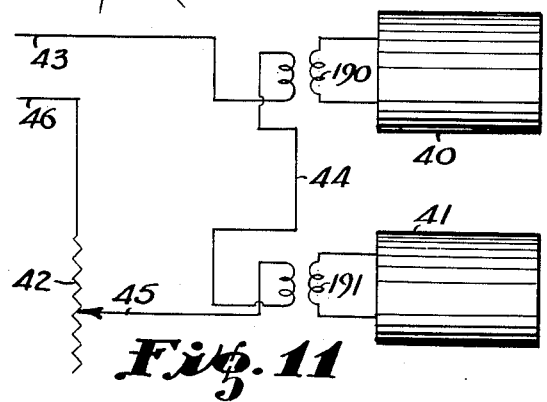
Fig. 11 is a schematic circuit diagram.
Figure 15:
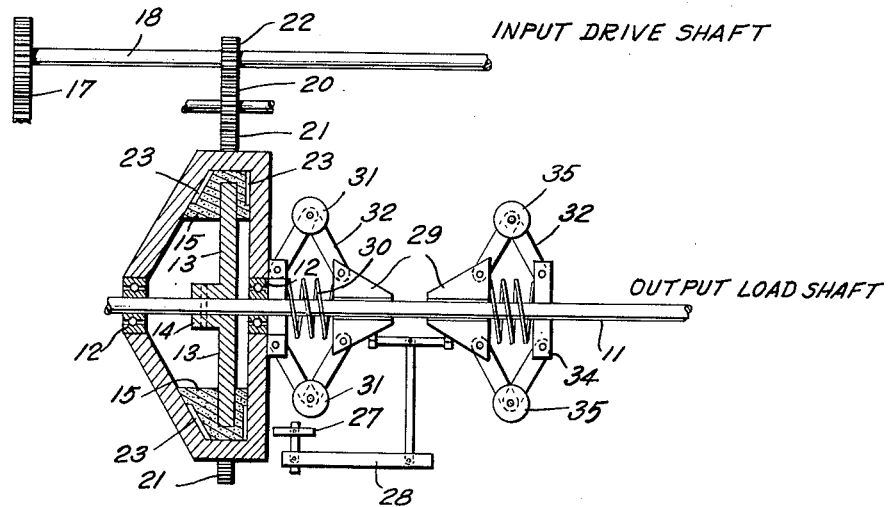
Fig. 15 is a fragmentary section showing a further modified form of magnetic flux producing means.
Figure 16:
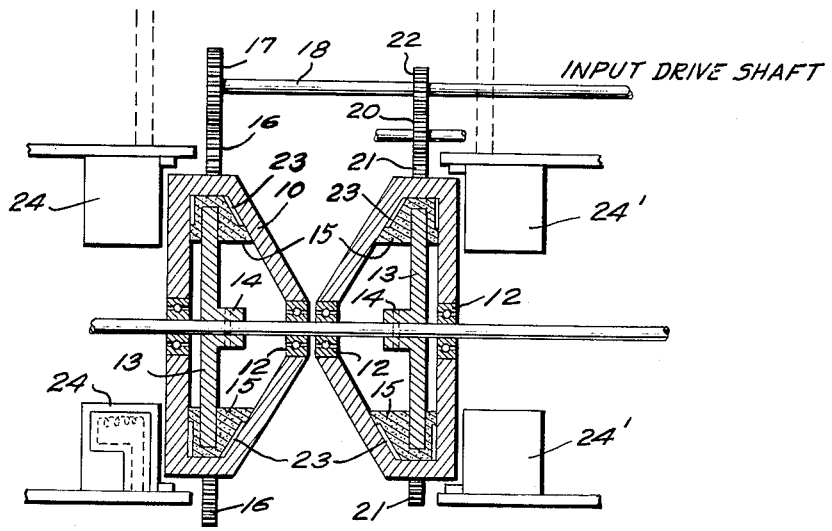
Fig. 16 is a sketch showing the differential use of permanent magnets for flux production.

Fig. 11 shows the use of transformers 190 and 191 with the generators 40, 41 and circuit of Fig. 2. As discussed above transformers 190 and 191 are intended to oppose the build up of flux producing current in coils 24 and 25 and once the current has reached a steady state value they oppose the break down of the flux. For this circuit generators 40 and 41 are direct current.

Fig. 12 shows the application of an accelerator pedal or throttle 200 as a control affecting the circuit of Fig. 2, as well as the other circuits shown. Contact rod 201 has a slide 202 which remains constantly on impedance 42 and increases the impedance in the circuit as the fuel supplied is increased.

Fig. 13 shows the application of manifold pressure control to the circuit of Fig. 2. An intake manifold 210 is supplied with a housing 211 containing a bellows 212 and a contact control stem 213. As the manifold vacuum of an internal combustion builds up more of impedance 42 is introduced into the circuit.

Figure 14:
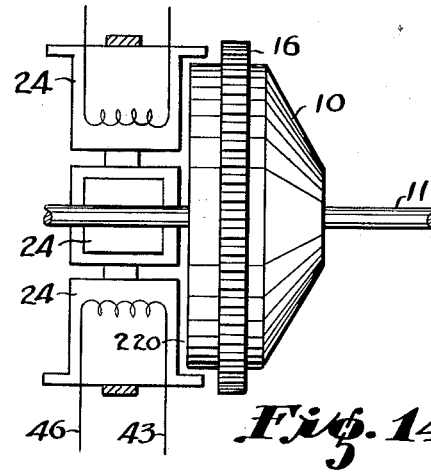
Fig. 14 is a fragmentary section showing a modified form of flux producing means.

Fig. 14 is intended to show that coil 24 is a modified form and the equivalent of coil 25. Although an air gap 220 is introduced the need of slip rings is eliminated.

In using the device in a vehicle, for example an automobile, where it is desired to couple the drive with the load the operation for an installation based on Fig. 2 would be as follows:

At standstill the operator may disconnect the drive from the load, for the purpose of starting the engine for example, by opening the circuit in wire 44 or at impedance 42. Windings 24 or 25 therefore carry no current and material 15 exerts no gripping action between housing 10 or 19 and disc 13. The opening of the circuit may of course be automatic if desired. However as the current required for some applications may be measured in milli-amps a battery may be placed in the circuit to act as a brake.

When the engine is running and the operator wishes to move he closes the circuit. Wires 72 and 73 may be connected to wires 46 and 43 of Fig. 2 and switch 64 used to open the circuit. In any event the circuit is closed with impedance 42 at part value and switch 64 in forward or reverse position as desired. The same operating lever could control both variable impedances 42 and switch 64. The output of generator 40 which is driven by the engine or drive shaft 18 is placed in the circuit through impedance 42. The idling value of impedance 42 is so large and the output of generator 40 so low that the current is reduced below any effective gripping action of material 15. At standstill the output of generator 41 on the load side is zero. Of course the engine may idle with the circuit open. This may be done where the closing of the circuit does not cause a sufficient surge of current to jolt the vehicle or stall the engine. As the throttle of the engine is opened the increasing engine speed builds up the output of generator 40 and the increasing current builds up a field in windings 24 or 25 and causes material 15 to exert gripping action between housing 10 or 19 and plate 13. A smooth clutching action is obtained and the vehicle moves. As engine speed builds up the output of generator 40 builds up and the gripping action is increased. On the other hand the engine speed may remain reasonably stable and as the vehicle moves faster generator 41 increases its output and the gripping action is increased. A portion of impedance 42 may be cut out to increase the gripping action. As the speed increases the slipping of disc 13 in material 15 decreases until a direct drive is obtained. As the efficiency of transfer of energy is quite high the system may be used as a transmission. Where the load on the engine increases to the point where its direct drive speed begins to fall off impedance 42 may be increased and the resultant slip between disc 13 and material 15 will yield the equivalent of a gear reduction. The manually controlled portion of impedance 42 may be used at any time to vary the gripping action within the limits of safe engineering. Automatic correlated control of important portions of impedance 42 is contemplated.

For example, pressing on the accelerator 200 may simultaneously increase the effective value of impedance 42 so that the engine is given an opportunity to gain speed before the action of generator 40 is such as to increase the power output at the load. A portion of impedance 42 may be controlled by the manifold pressure in the same way for the same purposes as shown in Fig. 13. In the same manner the fields of generators 40 and 41 may be varied for control purposes.

The operation of a system using a separate source of control current as shown in Fig. 3 utilizes variable impedances 97 and 110 controlled by the angular velocity of the drive and load shafts 92 and 91 respectively. The operation of the control and application of load is much the same as above. Impedance 119 may be used for manual control by manually setting contact slide 121.

In the operation of Fig. 5 the output of generator 81 is controlled by the speed of drive shaft 80. The variable impedance 82 is controlled by the speed of load shaft 83 being maximum when shaft 83 is stationary. Variable impedance 87 may include manual control and other automatic control arrangements as discussed.

In Figs. 6 and 7 the refinement of making the gripping action of material 15 a function of the load shaft velocity is omitted.

In Fig. 8 is an arrangement which might be applied to a railway locomotive or the like to eliminate the need for conversion from one form of energy to another as in the case of a diesel-electric drive. When the primary source of power was operating, such as an electric motor, diesel engine, turbine or the like, it is set at a desired operating speed. The effective value of source 164 is varied as a speed of the load shaft 150. This gives extremely smooth incremental application of even the heaviest loads.

In Fig. 1 the control of magnets 27 may be obtained by a regular governing device 30—35 with an axially moving ring 29. In this way a number of magnets 27 may be linked to such a ring and have their positions varied according to the combined action of the speed of load shaft 11 and housings 10 and 19.

The invention lends itself to applications for acceleration control wherein the rate of increase of the output of generators 40 and 41 is used to control the value of impedance 42. This may be accomplished, for example, by using a D. C. generator and a transformer across its terminals. The output of the transformer being a function of voltage change may return to the circuit to delay the gripping action of material 15 during the acceleration period. On deceleration the transformer boosts the effective circuit voltage and causes material 15 to grip harder. This effect is caused by transients.

It will be appreciated that upon removal of the magnetic field or a decrease in its intensity, a corresponding decrease in the gripping action of the clutch should occur. Where there is substantial residual magnetism in the particles or filings the chains of magnetic particles can produce a drag which is highly undesirable. One function of the material added to the particle mix which is quite aside from lubrication is to cause the prompt break-down of the magnetic particle chains on removal of the energizing field. This is accomplished by the actual physical separation of particles by a thin coating such as an oil film. Elsewhere, mention is made of prevention of corrosion of the magnetic particles to maintain their characteristics. This is quite a different matter and does not include thin coatings which may result from mere surface oxidation or the like. Such thin coatings whether a film of oil, glycerine, or the like can in some applications be beneficial in eliminating drag. The above effect may be quite independent of any lubrication property as such which may or may not be present depending upon the material used or the character of the coating. A mix approaching a powder with magnetic filings may have particles so different in size that the filings are separated by other particles which may roll ball-like between adjacent filings to decrease friction and at the same time eliminate drag by breaking the chains of magnetic particles on the removal of the field.

It should be noted that when the effect of the magnetic field is removed and slip between housing 10 and plate 13 occurs, fins 23 and their equivalent channel structure also afford a mechanical chain breaking action by stirring the material mix 15.

The invention lends itself to wide application in the fields of power transmission, speed reduction, clutch drives, load lifting and load application. It is especially valuable where heavy loads are involved. It is however, equally applicable to control any indication applications such as governors and the like. The following table sets forth some of the possible combinations of the control arrangements.

|    | Drive       | External Circuit         | Load        |
|----|-------------|--------------------------|-------------|
| 1  | Generator   | Impedance                | Generator.  |
| 2  | do          | Impedance and battery    | Do.         |
| 3  | do          | Impedance                | Impedance.  |
| 4  | do          | Impedance and battery    | Do.         |
| 5  | do          | Impedance                |             |
| 6  | do          | Impedance and battery    |             |
| 7  | do          |                          | Generator.  |
| 8  | do          |                          | Impedance.  |
| 9  | do          |                          |             |
| 10 | Impedance   | Battery                  | Generator.  |
| 11 | do          | Battery and impedance    | Do.         |
| 12 | do          | Battery                  | Impedance.  |
| 13 | do          | Battery and impedance    | Do.         |
| 14 | do          | Battery                  |             |
| 15 | do          | Battery and Impedance    |             |
| 16 |             |                          | (magnets).  |

Where the term impedance is used it is employed generically and may include a combined group of several separate but associated resistors, inductances and/or capacitances. For example the control circuit impedance may include an impedance controlled by the accelerator of an automobile, another controlled by the manifold pressure and a third subject to manual control, all in the same circuit in series, series-parallel or parallel combinations depending upon the control effect desired. For the normal automotive application all may be in series. As noted above the relation of some of the impedances may be an inverse function.

The vehicle employed may be oil or include oil. Glycerine may be employed where the loads are light and heating effects are limited. For heavier loads the pasty and the powder mixes that approach a powder avoid bearing contamination and resist the bad effects of localized heating. The magnetic material may be powdered magnetite which is the fully oxidized magnetic oxide of iron, carbonyl iron, iron-nickel compounds and the like. For example the pasty mass mentioned above may comprise the finely divided magnetic material mixed with a relatively small amount of oil while the powder form may be the finely divided magnetic material alone or with a very small amount of oil. For heavy duty transmissions such as automobiles, diesel locomotives, cranes and the like, it is preferred to use the dry finely divided magnetic material alone or a powdery mixture of the magnetic material with oil which provides some lubrication without caking on the one hand or penetration of the journal-bearing seals 12 on the other hand. Bearing contamination may be avoided as described above, but local heating effects between the magnetic mass and the moving parts require that the vehicle, when used at all, be stable at fairly high temperatures where loads are substantial as in the automotive field. For such applications the dry mass in powder form or as filings is preferred. The terms powder and filings are in many cases substantial equivalents and the terms "particle", "powdery" and "finely divided material," are intended to include both.

The localized heating due to point or very small area friction contact not only tends to break down oil and glycerine vehicles, but may affect the magnetic material itself by corrosion or oxidation due to high temperatures which may also change the physical and chemical characteristics of the magnetic material. For this reason in some applications the fully oxidized magnetite, $Fe_3O_4$, may function better than carbonyl iron, $Fe(CO)_4$, in which the carbonyl radical may be unstable at the required peak operating temperature. For this reason the iron-nickel compounds are mentioned above in addition to iron-carbon compounds as representative of the large class of magnetic alloys in general which have good magnetic properties over a wide range of temperatures and resist corrosion, oxidation and other undesirable changes when under load and subject to localized high temperatures. These examples are representative and are not intended to be limiting either as individual items or as a class.

While there have been described above what are at present considered to be the preferred embodiments of the invention, it will be apparent to those skilled in the art that various changes and modifications may be made therein, in the light of the above disclosure, without departing from the spirit or scope of the invention. Accordingly the appended claims have been variously worded in generic terms to include all those modifications and equivalent structures which fall within the true spirit of the invention.

I claim:

1. In a power transmitting device, power input means, power output means, power transmitting means comprising finely divided magnetic material for operatively connecting said power input means and said power output means, and magnetic flux producing control means controlling said power transmitting means and the connection made between said input and output means, said control means comprising means for varying the effect of said magnetic flux and means operatively connecting said last named means to at least one of said input and said output means, said operatively connecting means controlling said last named means to vary the effect of said magnetic flux on said finely divided magnetic material in response to the action of at least one of said input and said output means.

2. In combination a power source, power output means, means comprising finely divided magnetic material for operatively connecting said source and said output means said magnetic material being an alloy of iron and a material resistant to oxidation, magnetic field producing means operatively associated with said material and positioned to cause the material to cohere into a firm force transmitting mass, the effective magnetic field of said field producing means with respect to said magnetic material being operatively variable and controlled by the action of at least one of said source and said output means.

3. In a power drive system, a drive shaft, a power output shaft, power transmitting means connecting both said shafts comprising a rotating housing containing finely divided magnetic material comprising a mixed body of particles normally free to move under accelerating forces and a movable member connected to said output shaft and arranged to be acted upon by said magnetic field responsive mixture, magnetic field producing means for said power transmitting means, control means for said field producing means comprising means driven by and responsive to the angular velocity of one of said shafts for varying the effective field produced thereby.

4. In a combined vehicular transmission and clutch, means for supplying power, means for delivering power, means connecting both said means in a power transmitting relation comprising finely divided magnetic material and flux producing means to subject said material to a magnetic field, the power transmitting relation of said first three named means being a function of the action of said magnetic field on said magnetic material and electrical circuit means to control the effective flux produced by said flux producing means, said electrical circuit means comprising a unit having relatively movable parts and having a variable voltage across the effective terminals thereof, said unit being driven by at least one of said means for supplying power and said means for delivering power whereby the effective flux applied to said finely divided material is a function of the operating condition of at least one of said means for supplying power and said means for delivering power.

5. The combination set forth in claim 4, the effective magnetic flux acting to cohere said finely divided magnetic material in said clutch being controlled by the combined action of both said means for supplying power and said means for delivering power said means for supplying power being a drive shaft having one of said units connected thereto and driven thereby, said means for delivering power being a driven shaft having one of said units connected thereto and driven thereby.

6. The combination set forth in claim 5, said unit comprising a governor driven by the power means to which the unit is connected and a variable impedance controlled by movement of the governor, said variable voltage appearing across the terminals being a function of governor movement.

7. In a power drive, means for supplying power, means for delivering power, means for connecting both said means in a power transmitting relation comprising finely divided magnetic material mixed with a lubricant to form a powder mixture, means mounted for rotation embedded in said mixture and flux producing means to subject said material to a magnetic field and cause it to grip said means mounted for rotation, effective magnetic flux varying means having relatively movable parts, one of said parts being connected to be driven by one of said power means and to vary the effective magnetic flux in response to changes in velocity of said one of said power means.

8. In a power drive, a drive shaft for supplying power, a driven shaft for delivering power, means for connecting both said shafts in a power transmitting relation comprising finely divided magnetic material, means mounted for rotation embedded in said material and flux producing means to subject said magnetic material to a magnetic field and cause it to grip said means mounted for rotation, an electrical circuit containing said flux producing means and means for varying the current in said circuit comprising an element driven by one of said shafts whereby the current in said circuit and the effective magnetic flux are a function of the angular velocity of said one of said shafts.

9. In a power transmission, a drive shaft, a driven shaft, means connecting said shafts in a power transmitting relation comprising a housing having finely divided magnetic material therein, means mounted for rotation and embedded in said material, an electrical circuit comprising a flux producing winding positioned adjacent said housing and with said material within the compass of the flux field to be produced and a source of variable electrical potential having means connected to one of said shafts and moved thereby for varying the effective value of the flux produced by the current flowing in said winding in response to said potential, and conductors connecting said winding and said source.

10. The combination set forth in claim 9, said circuit having a variable impedance therein said means connected to one of said shafts comprising a governor means driven thereby and having a movable contact for varying the effective value of said impedance.

11. The combination set forth in claim 9, an internal combustion engine connected to said drive shaft, said circuit having a variable impedance therein, movable diaphragm pressure responsive means having a connection to the intake manifold of said engine and having an arm operatively connected to alter the effective value of said impedance as a function of the manifold pressure of said engine.

12. The combination set forth in claim 9, an internal combustion engine connected to said drive shaft, an impedance in said circuit, means to vary the effective value of said impedance and linkage means connecting said last named means to the throttle of said engine whereby the effective value of said impedance is a function of the throttle position of said engine.

13. The combination set forth in claim 9, a cable actuating drum connected to said driven shaft and a variable control impedance in said circuit.

14. The combination set forth in claim 9, said potential source comprising a generator driven by said driven shaft and a variable control impedance in said circuit.

15. The combination set forth in claim 14, said source of electrical potential comprising a second generator driven by said drive shaft.

16. The combination set forth in claim 9, said source of potential comprising a battery and said means to vary the effective flux comprising governor means having a linkage connection to control the flux producing current flowing in said circuit.

17. The combination set forth in claim 9, said source of variable potential comprising a generator connected to said circuit and driven by said drive shaft, a governor-controlled impedance unit having a variable impedance connected in said circuit and the governor thereof driven by said driven shaft.

18. The combination set forth in claim 7, a turbine having a drive shaft comprising said means for supplying power.

19. The combination set forth in claim 7, a diesel engine mechanically connected to said means for supplying power whereby prime mover mechanical energy is transmitted to said means for delivering power by said means for connecting in power transmitting relation.

20. The combination set forth in claim 4, a prime mover connected to said means for supplying power whereby prime mover mechanical energy is transmitted as mechanical energy by said first three named means.

21. The combination set forth in claim 7, a plurality of said means for connecting both said means in power transmitting relation, each means of said plurality having its respective mass of finely divided magnetic material subject to a separate magnetic field.

22. The combination set forth in claim 7, said means for connecting comprising a housing having means on an inner wall thereof to impart angular acceleration to said finely divided magnetic material.

23. The combination set forth in claim 7, a plurality of said connecting means, said first named means having a drive shaft, said second named means having a driven shaft, one of said plurality being arranged to rotate said driven shaft in one direction, a countershaft, and another of said plurality being connected to said countershaft to rotate said driven shaft in the opposite direction whereby a succession of desired directions and speeds of rotation of said driven shaft are obtainable.

24. The combination set forth in claim 7, a prime mover connected to said means for supplying power, a plurality of said connecting means each having a housing geared to one of said means for supplying and said means for delivering power, at least one of said housings being geared at a different angular velocity ratio than another of said housings whereby said prime mover may deliver energy smoothly to said means to deliver power at different angular velocities.

25. The combination set forth in claim 7, said effective flux varying means comprising a generator driven by said means for supplying power, a generator driven by said means for delivering power and an external circuit containing an impedance.

26. The combination set forth in claim 7, said means controlled by angular velocity comprising a direct current generator having a transformer connected across the terminals thereof, the output of said transformer being connected to said flux producing means whereby the flux build up by said flux producing means is delayed on acceleration of said means for supplying power and flux breakdown is delayed on deceleration thereof.

27. The combination set forth in claim 7, an internal combustion engine connected to said means for supplying power, said effective flux varying means comprising a generator driven by said means for supplying power and a governor-controlled impedance driven by said means for delivering power.

28. The combination set forth in claim 7, said effective flux varying means comprising a governor-controlled impedance driven by said means for supplying power, a generator driven by said means for delivering power and an external circuit containing a battery.

29. The combination set forth in claim 7, a vehicle, a source of potential connected to lock said means for supplying power and said means for delivering power whereby said connecting means can function to supply braking action.

30. The combination set forth in claim 7, said connecting means being geared to one of said power means, a second means for connecting both said power means in a power transmitting relation, said second connecting means being geared to rotate in the opposite direction from said first connecting means.

31. The combination set forth in claim 7, said connecting means having a housing geared to one of said power means, a second means for connecting both said power means in a power transmitting relation, said second means having a housing geared to rotate in the opposite direction from said first connecting means, said magnetic material being mixed with a vehicle to provide a magnetic field responsive mixture in substantially powder form with low friction loss and means on said housing to engage said mixture.

32. The combination set forth in claim 7, said connecting means having a housing geared to one of said power means, a second means for connecting both said power means in a power transmitting relation, said second means having a housing geared to rotate in the opposite direction from said first connecting means, said flux producing means comprising separate elements for each of said two connecting means and circuit conductors connected to energize said separate elements both selectively and simultaneously so that forward drive, reverse drive and braking action are selectively obtained.

33. In a power transmitting device, power input means, power output means, power transmitting means connecting said power input means and said power output means, said power transmitting means comprising a housing fastened to one of said first two power means, a member fastened to the other of said two power means and mounted for rotation within said housing, finely divided magnetic material comprising a corrosion resistant steel in the form of a powder within said housing and embedding a portion of said member mounted for rotation and engaging means carried by said housing for acting on said magnetic material and magnetic field producing means mounted in operative relation to said magnetic material and means movable by one of said first two power means for varying the effective magnetic flux in said magnetic material as a function of the angular velocity thereof.

34. The combination set forth in claim 7, said effective flux varying means comprising a governor-controlled impedance driven by one of said power means and an external circuit containing a battery.

35. The combination set forth in claim 33, said engaging means comprising projections extending from said housing.

36. The combination set forth in claim 7, said effective flux varying means comprising a permanent magnet movably mounted with respect to said magnetic material.

37. The combination set forth in claim 33 plus just sufficient liquid vehicle to form a substantially dry putty-like pasty mass of magnetic material.

38. The combination set forth in claim 8, said finely divided magnetic material being mixed with a vehicle, said material being in substantially powder form, said means for connecting having engaging means to act on said magnetic material.

39. A heavy duty coupling device comprising a driving member and a driven member, journal sealing bearing means mounting said members for relative movement with respect to each other, a force transmitting bonding mixture, means to hold said mixture in contact with both said members, said mixture comprising finely divided magnetic material in powder form, said mixture being responsive to the action of a magnetic field to bond together in force transmitting relation with respect to said members whereby the force transmitted by said members is a function of effective magnetic field strength and the active surfaces of said bearings remain substantially free of said powdery magnetic material, said magnetic material comprising a corrosion and heat resistant alloy and means for establishing a magnetic field for controlled bonding effect on said magnetic material.

40. The combination set forth in claim 39, means forming a film around individual magnetic particles whereby to improve the clutching action thereof on the application of a magnetic field.

41. A heavy duty coupling device comprising a driving member and a driven member, journal sealing bearing means mounting said members for relative movement with respect to each other, a force transmitting bonding mixture, means to hold said mixture in contact with both said members, said mixture comprising finely divided magnetic material responsive to the action of a magnetic field to bond together in force transmitting relation with respect to said members whereby the force transmitted by said members is a function of effective magnetic field strength, said bonding mixture being of such character that the active surfaces of said bearings remain substantially free of said finely divided magnetic material, an automotive vehicle having an engine, a drive shaft, a driven shaft and a standard transmission connecting said shafts in variable speed relation, said members of said coupling device being operatively connected to said shafts and said transmission, an accelerator pedal for said engine, means for establishing a magnetic field for controlled bonding effect in said mixture and control means for said field.

42. The combination set forth in claim 41, said control means for said field comprising means connected to said accelerator pedal and responsive at least in part to movement thereof to control said magnetic field in accordance with movement of said accelerator pedal.

43. The combination set forth in claim 41, said control means for said field comprising means connected to said driven shaft and responsive at least in part to movement thereof to control said magnetic field in accordance with movement of said driven shaft.

44. The combination set forth in claim 41, said control means for said field comprising means connected to an element of said transmission and responsive at least in part to movement thereof to control said magnetic field in accordance with predetermined movements of said transmission element.

45. The combination set forth in claim 41, said control means for said field comprising means connected to said drive shaft and responsive at least in part to movement thereof to control said magnetic field in accordance with predetermined speeds of rotation of said drive shaft.

46. The combination set forth in claim 41, an intake manifold for said engine, said control means for said magnetic field comprising means movable in response to the degree of vacuum in said intake manifold and responsive at least in part to control said magnetic field in accordance with said degree of vacuum.

47. The combination set forth in claim 41, an operator controlled variable position member on said vehicle, said control means for said magnetic field comprising means connected to said member and responsive at least in part to movement thereof to control said magnetic field in accordance with selected positions of said member.

48. In combination in an automotive power transmission system, a device for transmitting torque comprising two closely spaced adjacent relatively movable elements, a mass of relatively movable contiguous discrete magnetic particles in the space between said elements, means for subjecting said elements and particles to a magnetic field of sufficient intensity to cause such attraction among said particles whereby the coherency of the mass is increased for the transmission of torque through said mass, bearing means mounting said elements for rotation, said particles comprising a ferro magnetic alloy of iron and a metal imparting corrosion resistant properties to said magnetic alloy.

49. The combination set forth in claim 48, control means for varying the effective value of said magnetic field with respect to said particle mass, drive means connected to one of said elements, driven means connected to the other of said elements, said control means being responsive to the motion of at least one of said drive means and said driven means.

50. The combination set forth in claim 49, said particle mass approaching a dry powdery mixture and said bearings having journal seals, whereby the active surface of said bearing remain substantially free of said particles.

51. A device for transmitting torque comprising at least two spaced adjacent elements, a mass of relatively movable contiguous discrete magnetic particles in effective portions of the space between said elements, magnetic field producing means mounted for subjecting said particles to a magnetic field of sufficient intensity to cause such attraction between said particles whereby the coherent consistency of the mass is increased for the smooth transmission of force through said mass, said particles forming a mixture approaching a powder, drive means connected to one of said elements, driven means connected to another of said elements, sealed bearings of normal construction for each of said drive means and driven means, said particles being sufficiently large so that said bearings remain substantially free of said mixture whereby said bearings have a normal operating life.

52. The combination set forth in claim 51, said particles comprising a magnetic alloy of iron and a metal imparting corrosion resistant properties to said magnetic alloy.

53. The combination set forth in claim 52, in which said metal imparting corrosion resistant properties is nickel.

54. The combination set forth in claim 51, control means for varying the effective value of said magnetic field with respect to said particle mass, said control means having a connection making it responsive to at least one of said drive means and said driven means.

55. The combination set forth in claim 54, a prime mover connected to said drive means, throttle means for said prime mover, said control means having a linkage connection making it also responsive to said throttle means.

56. In combination in an automotive vehicular drive, a source of motive power, drive means connected to said source, driven means, bearings for said drive means and said driven means, means for transmitting variable torque from said drive means to said driven means comprising an automotive transmission having gears in meshed driving relation and a clutch device for controlling the transmission of said torque from one element to a spaced adjacent relatively movable element including therebetween a mass of contiguous relatively movable discrete magnetic particles, said clutch device having enclosure means for maintaining said mass of contiguous relatively movable discrete magnetic particles in a selected portion of the space between said elements, means for subjecting said particles to a magnetic field to produce a coupling force between said elements, and means for varying the effective strength of said field relative to said particle mass to control said coupling force, said particle mass being composed of particles enclosed in individual film coatings and free from free liquid whereby more effective clutch action is obtained and the bearing surfaces of said bearing are maintained substantially free of said particles, said elements being operatively connected to said gears, said drive means and said driven means whereby motive power may be transmitted from said drive means to said driven means in a selected manner.

57. The combination set forth in claim 56, said means for varying the effective strength of said field having a connection making it responsive to at least one of said drive means and said driven means.

58. The combination set forth in claim 57, an accelerator for said source of motive power, said means for varying the effective strength of said field having a linkage connection making it also responsive at least in part to movement of said accelerator.

59. The combination set forth in claim 56, an accelerator pedal for said source of motive power, said means for varying the effective strength of said magnetic field being responsive at least in part to movement of said accelerator pedal.

60. In combination, an automobile having an automatic transmission and an internal combustion engine having an intake manifold and an accelerator for controlling the fuel supply thereto, a drive shaft connected to said engine, a driven shaft connected to drive said automobile, a coupling device cooperating with said transmission to connect said drive shaft and said driven shaft in one of a plurality of different driving ratios, said coupling device comprising at least a pair of coupling members mounted for rotation relative to each other and having spaced force receiving portions, bearing means mounting said coupling members for relative movement, means connecting one of said coupling members in driving relation with said drive shaft, means connecting the other of said coupling members in driving relation with said driven shaft, at least one of said connecting means utilizing elements of said transmission to complete said connection, means for establishing a magnetic field between said spaced force receiving portions, magnetic material in said field in the space between said force receiving portions and responsive to said field for establishing a load transmitting bond between said magnetic material and said coupling members so that rotation of one coupling member tends to cause rotation of the other member, means cooperating with said coupling members to maintain said magnetic material in said field, said magnetic material comprising finely divided magnetic particles, and magnetic field control means having connection means making the effective magnetic field controlled thereby.

61. The combination set forth in claim 60, a plurality of said pairs of coupling members operatively associated with different drive ratios in said transmission and a plurality of means for establishing a magnetic field whereby said drive shaft and said driven shaft can be coupled to drive said automobile at different driving ratios.

62. The combination set forth in claim 61, operator controlled selector means for said automatic transmission, the position of said selector means as set by the operator selectively determining which of said pairs of coupling members may be subjected to a magnetic field to establish force transmitting relation.

63. The combination set forth in claim 62, said magnetic material comprising a mixture of said finely divided magnetic particles and a limited amount of lubricant, said bearings being so constructed and arranged with respect to said particles that they remain substantially free from contamination by said mixture.

64. The combination set forth in claim 63, said magnetic field control means comprising a voltage source, a magnetic field producing circuit and means connected to control said voltage in accordance with at least one of said factors.

65. The combination set forth in claim 64, said means to control said voltage comprising a variable impedance as a part of said circuit and a speed responsive governor means driven by one of said shafts and connected for varying said impedance according to the speed of rotation of said one of said shafts.

66. The combination set forth in claim 60, said magnetic field control means comprising at least one generator driven by one of said shafts and connected to said means for establishing a magnetic field, said magnetic material comprising a mixture of said finely divided magnetic particles and journal seals for said bearings proof against the entry of said mixture between the bearing surfaces.

67. The combination set forth in claim 60, a plurality of said pairs of coupling means operatively associated with different drive ratios in said transmission, said finely divided magnetic particles comprising a magnetic alloy of iron and at least one heat resistant metal to form more stable magnetic particles under heavy load conditions.

68. The combination set forth in claim 67, in which iron and nickel are alloyed.

69. The combination set forth in claim 1, said magnetic material comprising a mixture of the finely divided magnetic alloy particles coated with a hydrocarbon material providing improved clutch action.

70. In combination, an automobile having an automatic transmission and an internal combustion engine having an intake manifold and an accelerator for controlling the fuel supply thereto, a drive shaft connected to said engine, a driven shaft connected to drive said automobile, a coupling device forming part of said transmission to connect said drive shaft and said driven shaft, said coupling device comprising at least a pair of coupling members mounted for rotation relative to each other and having spaced force receiving portions, bearing means mounting said coupling members for relative movement, means connecting one of said coupling members in driving relation with said drive shaft, means connecting the other of said coupling members in driving relation with said driven shaft, alternating current supply means for establishing a magnetic field between said spaced force receiving portions, magnetic material in said field in the space between said force receiving portions and responsive to said field for establishing a load transmitting bond between said magnetic material and said coupling members so that rotation of one coupling member will cause rotation of the other member, said magnetic material comprising relatively finely divided magnetic particles of a rust resistant steel, and control means for said magnetic field.

71. The combination set forth in claim 70, said magnetic material comprising a mixture of said finely divided magnetic particles.

72. The combination set forth in claim 71, said magnetic field control means comprising a voltage source, a magnetic field producing circuit and means connected to control said voltage.

73. The combination set forth in claim 72, said means to control said voltage comprising a variable impedance and a speed responsive governor means driven by one of said shafts and having a connection for varying said impedance according to the speed of rotation of said one of said shafts.

74. The combination set forth in claim 70, said magnetic field control means comprising at least one generator driven by one of said shafts and connected to said means for establishing a magnetic field, said magnetic material comprising a mixture of said finely divided magnetic particles and non-magnetic material and journal sealing means for said bearings proof against the entry of said mixture between the bearing surfaces.

75. In combination, an automobile having a transmission and an internal combuston engine having an intake manifold and an accelerator for controlling the fuel supply thereto, a drive shaft connected to said engine, a driven shaft connected to drive parts of said automobile, a coupling device forming part of said transmission to connect said drive shaft and said driven shaft, said coupling device comprising at least a pair of coupling members mounted for rotation relative to each other and having spaced force receiving portions, bearing means mounting said coupling members for relative movement, means connecting one of said coupling members in driving relation with said drive shaft, means connecting the other of said coupling members in driving relation with said driven shaft, means for establishing a magnetic field between said spaced force receiving portions, magnetic material in said field in the space between said force receiving portions and responsive to said field for establishing a load transmitting bond between said magnetic material and said coupling members so that rotation of one coupling member tends to cause rotation of the other member, said magnetic material being finely divided, and control means for said magnetic field.

76. In combination an automotive vehicle having an internal combustion engine, said engine having an intake manifold and an accelerator means controlling fuel supply thereto, a transmission means for said automobile having a power supply means comprising a drive shaft and a power delivery means comprising a driven shaft, at least one coupling means for connecting said drive shaft and said driven shaft in power transmitting relation, said coupling means comprising spaced force receiving and transmitting elements with magnetic particle material therebetween and magnetic field establishing means comprising a circuit having at least one magnetic flux producing winding and a voltage source for producing magnetic flux to subject said magnetic material to a magnetic field and cause it to establish a coupling action between said force receiving elements, bearing means mounting said force receiving elements for relative movement, and magnetic field control means comprising means to vary the current flow in said circuit.

77. The combination set forth in claim 76, a plurality of said coupling means operatively associated in said transmission with means providing different drive ratios between said drive shaft and said driven shaft and operator controlled selector means connected to determine which coupling means is to be subjected to a magnetic field to establish force transmitting relation among said magnetic particles which comprise a well mixed body normally free to move under accelerating force.

78. The combination set forth in claim 77, said magnetic material comprising an alloy of iron and a metal having related magnetic properties and resistant to oxidation.

79. The combination set forth in claim 78, said control means for said magnetic field comprising means connected to said accelerator and being responsive at least in part to movement thereof to control said magnetic field.

80. The combination set forth in claim 78, said control means for said magnetic field comprising means connected to said driven shaft and being responsive at least in part to movement thereof to control said magnetic field.

81. The combination set forth in claim 78, said control means for said magnetic field comprising means connected to said drive shaft and being responsive at least in part to movement thereof to control said magnetic field.

82. The combination set forth in claim 78, said control means for said magnetic field comprising means connected to said intake manifold and being responsive at least in part to the degree of vacuum in said intake manifold to control said magnetic field.

83. The combination set forth in claim 78, a manually controlled member on said automobile constructed and mounted to occupy a plurality of positions to be determined and set from time to time by the operator, said control means for said magnetic field comprising means connected to said member and being responsive at least in part to movement thereof to control said magnetic field in accordance with selected positions of said member.

84. The combination set forth in claim 60, said control means for said magnetic field comprising means connected to said accelerator and being responsive at least in part to movement thereof to control said magnetic field.

85. The combination set forth in claim 60, said control means for said magnetic field comprising means connected to said driven shaft and being responsive at least in part to movement thereof to control said magnetic field.

86. The combination set forth in claim 60, said control means for said magnetic field comprising means connected to said drive shaft and being responsive at least in part to movement thereof to control said magnetic field.

87. The combination set forth in claim 60, said control means for said magnetic field comprising means connected to said intake manifold and being responsive at least in part to the degree of vacuum in said intake manifold to control said magnetic field.

88. The combination set forth in claim 60, a manually controlled member on said automobile constructed and mounted to occupy a plurality of positions to be determined and set from time to time by the operator, said control means for said magnetic field comprising means connected to said member and being responsive at least in part to movement thereof to control said magnetic field in accordance with selected positions of said member.

89. The combination set forth in claim 70, said control means for said magnetic field comprising means connected to said accelerator and being responsive at least in part to movement thereof to control said magnetic field.

90. The combination set forth in claim 70, said control means for said magnetic field comprising means connected to said driven shaft and being responsive at least in part to movement thereof to control said magnetic field.

91. The combination set forth in claim 70, said control means for said magnetic field comprising means connected to said drive shaft and being responsive at least in part to movement thereof to control said magnetic field.

92. The combination set forth in claim 70, said control means for said magnetic field comprising means connected to said intake manifold and being responsive at least in part to the degree of vacuum in said intake manifold to control said magnetic field.

93. The combination set forth in claim 70, a manually controlled member on said automobile constructed and mounted to occupy a plurality of positions to be determined and set from time to time by the operator, said control means for said magnetic field comprising means connected to said member and being responsive at least in part to movement thereof to control said magnetic field in accordance with selected positions of said member.

94. The combination set forth in claim 75, said control means for said magnetic field comprising means connected to said accelerator and being responsive at least in part to movement thereof to control said magnetic field.

95. The combination set forth in claim 75, said control means for said magnetic field comprising means connected to said driven shaft and being responsive at least in part to movement thereof to control said magnetic field.

96. The combination set forth in claim 75, said control means for said magnetic field comprising means connected to said drive shaft and being responsive at least in part to movement thereof to control said magnetic field.

97. The combination set forth in claim 75, said control means for said magnetic field comprising means connected to said intake manifold and being responsive at least in part to the degree of vacuum in said intake manifold to control said magnetic field.

98. The combination set forth in claim 75, a manually controlled member on said automobile constructed and mounted to occupy a plurality of positions to be determined and set from time to time by the operator, said control means for said magnetic field comprising means connected to said member and being responsive at least in part to movement thereof to control said magnetic field in accordance with selected positions of said member.

References Cited in the file of this patent

UNITED STATES PATENTS

| | | |
|---|---|---|
| 1,830,564 | Rudqvist | Nov. 3, 1931 |
| 1,975,733 | Schweich | Oct. 2, 1934 |
| 2,373,453 | Brunken | Apr. 10, 1945 |
| 2,417,051 | Banker | Mar. 11, 1947 |
| 2,575,360 | Rabinow | Nov. 20, 1951 |

OTHER REFERENCES

National Bureau of Standards Technical Report No. 1213, March 30, 1948.